United States Patent
Sih et al.

[11] Patent Number: 5,999,828
[45] Date of Patent: Dec. 7, 1999

[54] MULTI-USER WIRELESS TELEPHONE HAVING DUAL ECHO CANCELLERS

[75] Inventors: Gilbert C. Sih; Samir Kumar Gupta, both of San Diego, Calif.

[73] Assignee: Qualcomm Incorporated, San Diego, Calif.

[21] Appl. No.: 08/820,934

[22] Filed: Mar. 19, 1997

[51] Int. Cl.⁶ .................................................. H04Q 7/20
[52] U.S. Cl. .......................................... 455/570; 379/410
[58] Field of Search ................................ 379/410, 411, 379/402, 406, 388, 390, 202–205, 206–211, 391, 392; 704/233, 226; 455/570, 67.3, 557, 560, 561

[56] References Cited

U.S. PATENT DOCUMENTS

| | | | |
|---|---|---|---|
| 4,629,829 | 12/1986 | Puhl et al. | 379/390 |
| 4,712,235 | 12/1987 | Jones, Jr. | 379/410 |
| 4,890,315 | 12/1989 | Bendixen et al. | 379/59 |
| 4,912,758 | 3/1990 | Arbel | 379/388 |
| 4,935,919 | 6/1990 | Hiraguchi | 379/410 |
| 5,131,032 | 7/1992 | Esaki et al. | 379/410 |
| 5,206,854 | 4/1993 | Betts et al. | 379/410 |
| 5,307,405 | 4/1994 | Sih | 379/411 |
| 5,371,789 | 12/1994 | Hirano | 379/410 |
| 5,381,475 | 1/1995 | Cavallo | 379/410 |
| 5,386,465 | 1/1995 | Addeo et al. | 379/410 |
| 5,546,459 | 8/1996 | Sih et al. | 379/411 |
| 5,553,137 | 9/1996 | Nyhart et al. | 379/410 |
| 5,559,881 | 9/1996 | Sih | 379/410 |
| 5,577,097 | 11/1996 | Meek | 379/411 |
| 5,608,793 | 3/1997 | Uriya | 379/406 |
| 5,649,012 | 7/1997 | Gupta et al. | 379/410 |
| 5,748,726 | 5/1998 | Unno | 379/410 |
| 5,812,951 | 9/1998 | Ganesan et al. | 455/560 |
| 5,839,067 | 11/1998 | Jonsson | 455/561 |
| 5,852,661 | 12/1998 | Chen | 379/411 |

FOREIGN PATENT DOCUMENTS 2213686  8/1989  United Kingdom ............. H04Q 7/04

*Primary Examiner*—Dwayne D. Bost
*Assistant Examiner*—Jean A Gelin
*Attorney, Agent, or Firm*—Russell B. Miller; Thomas R. Rouse; Thomas M. Thibault

[57] ABSTRACT

A method and apparatus for canceling both earseal and hybrid echo in a Wireless Local Loop telephone system is disclosed. The present invention operates within a subscriber station having a plurality of telephone inputs, one of which is a dedicated handset and at least one other input being a standard analog telephone. During a conference call between a far end speaker and two near end speakers, the far end speaker may hear an echo of his own voice due to an earseal echo generated by the dedicated handset and a hybrid echo generated by a 4-to-2 wire hybrid interface within the subscriber station. In accordance with the present invention, two distinct echo cancellers are used in the subscriber station to reduce the two types of echo. A first echo canceller is optimized to remove the earseal echo generated at the dedicated handset while a second echo canceller is optimized to remove the hybrid echo generated at the 4-to-2 wire hybrid. The two echo cancellers operate independently such that neither echo canceller need adapt its filter coefficients when a change in the echo channel characteristics occur, such as when a speaker hangs up or another speaker joins the conversation.

13 Claims, 3 Drawing Sheets

MULTI-USER WIRELESS TELEPHONE HAVING DUAL ECHO CANCELLERS

BACKGROUND OF THE INVENTION

I. Field of the Invention

The present invention relates to digital communications. More particularly, the present invention relates to a novel and improved method and apparatus for canceling echo in a Wireless Local Loop telephone system.

II. Description of the Related Art

The use of code division multiple access (CDMA) modulation techniques is but one of several techniques for facilitating communications in which a large number of system users are present. The use of CDMA techniques in a multiple access communication system is disclosed in U.S. Pat. No. 4,901,307, (the '307 patent) entitled "SPREAD SPECTRUM MULTIPLE ACCESS COMMUNICATION SYSTEM USING SATELLITE OR TERRESTRIAL REPEATERS", and U.S. Pat. No. 5,103,459, (the '459 patent) entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

In the '307 and '459 patents, a multiple access technique is disclosed wherein a large number of mobile telephone system users, each having a transceiver, communicate through satellite repeaters or terrestrial base stations (also known as base stations, or cell-sites) using code division multiple access (CDMA) spread spectrum communication signals. The use of CDMA techniques results in a much higher spectral efficiency than can be achieved using other multiple access techniques.

Wire based or wire line telephone systems are the traditional method of providing non-mobile telephone service. Wire based telephone systems are well suited for this task because they provide high quality telephone connections at a low operating cost and can easily accommodate increased demand for telephone service by the introduction of new telephone wires into the existing network. A disadvantage of wire based telephone systems is the substantial infrastructure and capital necessary for their implementation. These requirements can make wire based telephone systems uneconomical for providing telephone service in areas that are remote or less populated, or in less developed areas where the required capital is not available. The result is that these less populated and developed areas often lack adequate telephone service. Also, the time necessary to put the required infrastructure in place makes wire based telephone systems less desirable in areas where new telephone service must be provided quickly.

Wireless cellular telephone systems require substantially less capital and infrastructure than wire based telephone systems and therefore provide a possible alternative for providing primary telephone service in areas where access to wire based telephone service is inadequate. Such wireless cellular systems are known as Wireless Local Loop (WLL).

In a WLL system, subscriber units are available in several varieties. One such subscriber unit is called a Integrated Subscriber System (ISS), which looks like an ordinary home telephone, except for an antenna which is used for transmission to and reception from the base station. The ISS unit contains a handset and a keypad, looking and functioning like an ordinary home telephone. Speech is provided from the integrated handset to the ISS base unit and converted into digital format so that it can be processed in accordance with CDMA techniques, as described in aforementioned patents '307 and '459.

Another type of subscriber unit is the Single Subscriber System (SSS) which provides for one or more inputs for standard telephone sets. An SSS unit can be used in a home where multiple standard telephone sets are used, each telephone having the same ESN so that only one call may be placed or received at one time. Users can pick up a second line and actively participate in the conversation, each home user able to communicate with the far end speaker as well as each other, similar to multiple phone extensions in the home.

Another type of WLL subscriber station can be described as a combination of ISS and the SSS, described above. The combined unit, called ISS/SSS looks like a standard home telephone, complete with a handset and keypad, but has additional RJ-11x input jacks to accommodate the addition of standard analog telephones. ISS/SSS, being a WLL telephone, is a wireless unit with respect to communications between the unit and a remote base station. ISS/SSS finds use in homes located in remote locations having no standard telephone service, where benefits of such systems outweigh the costs and delays of installing traditional land-line telephone systems.

Echo is a problem that must be addressed for both ISS and SSS WLL subscriber stations. In an ISS unit, an earseal echo is generated at the ISS handset causing the far end speaker to hear an annoying echo of his own voice. In an SSS unit, an echo results from the impedance mismatch in a 4-to-2-wire converter, known as a hybrid, within the SSS unit. The 4-to-2 wire conversion is needed so that standard analog telephones can be interfaced to the SSS.

For both ISS and SSS systems, the echo problem is alleviated using a single network echo canceller located inside the ISS or SSS unit. An example of a network echo canceller is disclosed in U.S. Pat. No. 5,307,405 (the '405 patent) entitled "NETWORK ECHO CANCELLER" assigned to the assignee of the present invention and incorporated by reference herein. In an ISS unit, the echo canceller can be optimized to cancel the earseal echo. In an SSS unit, the echo canceller can be optimized to cancel the hybrid echo.

In the ISS/SSS unit, use of a single echo canceller has several drawbacks to it, especially during conference calls where one speaker is using the ISS handset and a second speaker is using an analog telephone, where both speakers are talking to a far end user. If one ISS/SSS speaker hangs up during the conversation, the single echo canceller must adapt its filter coefficients to meet the changed echo channel characteristics. Similarly, if another speaker picks up another line at the ISS/SSS unit, the echo canceller must adapt its filter to the new echo condition.

Another problem with a single echo canceller in the ISS/SSS unit is its relatively long convergence time. The echo canceller can only update its filter coefficients when all ISS/SSS speakers are silent. The more speakers that use the ISS/SSS unit, the less time there will be silence from all parties and therefore the longer it will take for the echo canceller to adapt so as to adequately cancel the echo signal to the far end user.

What is needed is a way to cancel the echo to the far end user while eliminating the need to adapt the filters of the echo canceller when users are added or removed from the ISS/SSS unit. Other desirable characteristics would include fast convergence time and the ability to isolate each type of echo signal in order to optimize echo canceller performance.

SUMMARY OF THE INVENTION

The present invention is a novel and improved method and apparatus for removing echo to a far end user in a WLL telephone system. The technique uses two echo cancellers within the ISS/SSS unit. One echo canceller is optimized to eliminate the earseal echo and the other is optimized to remove the hybrid echo.

There are several advantages of using a dual echo canceller setup. First, each echo canceller can be specifically designed to eliminate the particular type of echo to be canceled. Second, if one ISS/SSS user hangs up during a conference call, the remaining channel's echo canceller does not have to reconverge its filter coefficients because each echo canceller operates only on the echo channel characteristics for its respective user. Another advantage of the present invention is fast echo canceller filter convergence because a near end silent state is more likely to occur with a single near end speaker than in a multi-user situation.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention discloses a Wireless Local Loop telephone system, called an ISS/SSS unit, which includes a handset and keypad as one telephonic interface, herein denoted as ISS, and other telephonic interfaces provided by standard analog telephones connected to the ISS/SSS unit via standard RJ-11x jacks, herein denoted as SSS. This type of subscriber station can find use in homes and businesses where multiple phone extensions are desirable.

One problem with the ISS/SSS unit is the presence of echo generated by the ISS and SSS interfaces to the far end speaker. For example, in a three way call between a far end speaker, an ISS speaker and a SSS speaker, an echo signal is generated by acoustic coupling between earpiece speaker and microphone at the ISS handset, while another echo signal results from the impedance mismatch developed at the 4-to-2-wire hybrid associated with the SSS interface. Throughout the remaining description of the present invention, the term far end speaker denotes the person who is not using the ISS/SSS unit while the term "near end speaker" denotes the speaker using the ISS/SSS unit.

Figure 1:
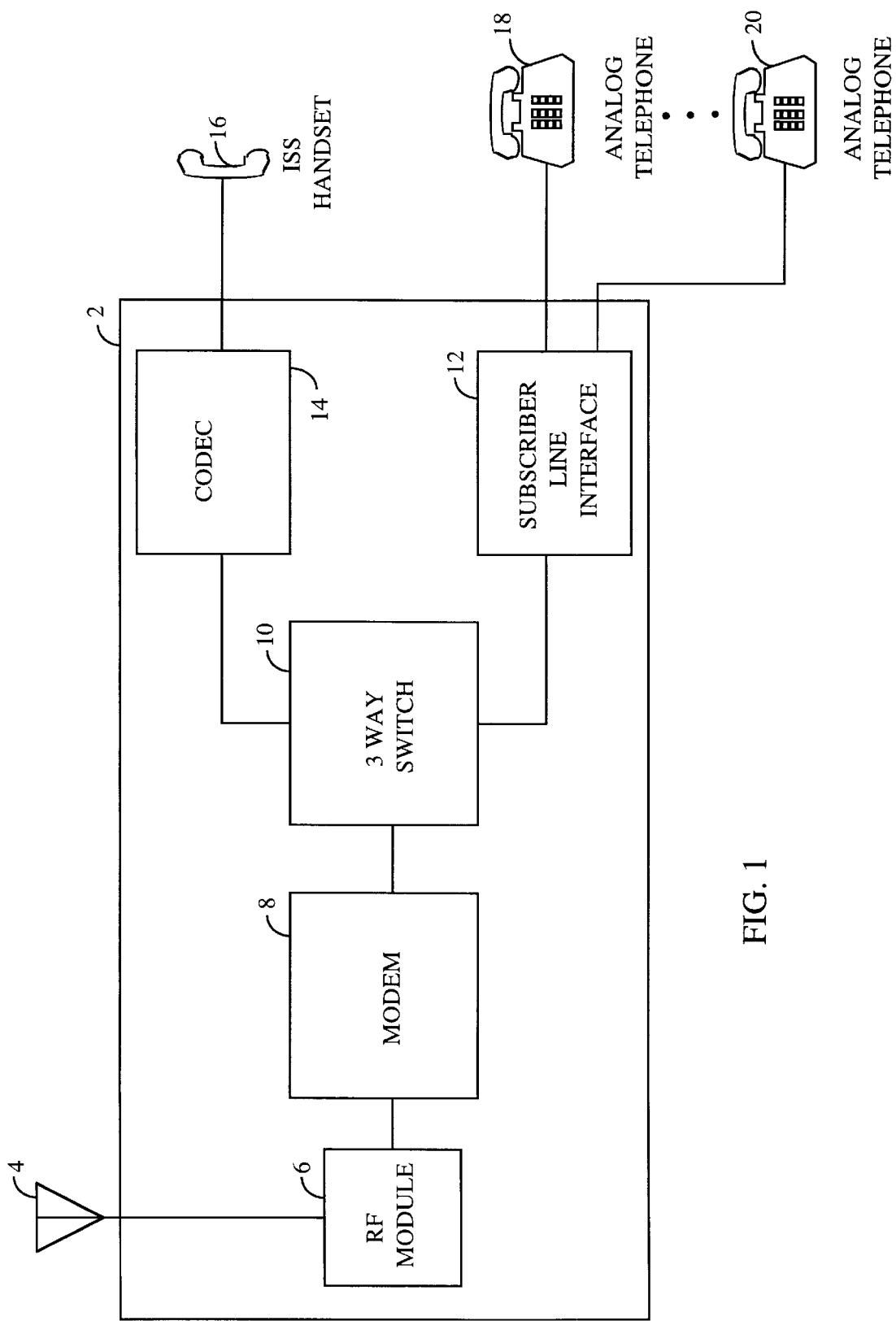
FIG. 1 is an overall block diagram of an ISS/SSS unit.

FIG. 1 is an overall block diagram of a WLL ISS/SSS subscriber station, denoted as ISS/SSS unit 2. Near end speakers may use either ISS handset 16 or analog telephone 18 or 20 to place and receive calls. Multiple analog telephones may be interfaced to ISS/SSS unit 2, denoted in FIG. 1 as including analog telephone 20. The interface between ISS handset 16 and codec 14 is a 4-wire interface, while the connections between subscriber line interface 12 and analog telephones 18 through 20 are each 2-wire. For purposes of discussion herein, it will be assumed that only analog telephone 18 is connected to ISS/SSS unit 2.

Three-way switch 10 controls communications between the far end speaker and ISS/SSS speaker(s). If only one speaker is using ISS/SSS unit 2, communications between that speaker and the far end speaker are routed through three-way switch 10 to either ISS handset 16 or analog telephone 18, depending, of course, which interface the near end speaker is using. Three way switch 10, in the exemplary embodiment, is configured in digital processor form, such as model ADSP-2181 of the ADSP-2100 series of digital signal processors manufactured by Analog Devices of Norwood, Mass. It should be understood that other digital signal processors may be programmed to function in accordance with the teachings herein. Alternatively, other implementations of three way switch 10 may be configured from discrete processors or in application specific integrated circuit (ASIC) form.

When ISS handset 16 is in use, speech from the near end speaker is provided to codec 14 where it is transformed from an analog signal into digitized PCM data samples. If no other near end speaker is using ISS/SSS unit 2, the digital samples are routed to modem 8, where the PCM samples are encoded into data packets that are modulated using any number of techniques including TDMA, FDMA, or CDMA. The modulated data is then provided to RF module 6, where it is upconverted to a high frequency signal and then transmitted via antenna 4 to remote base station(s), which are not shown.

Received speech from the far end user arrives at antenna 4 as a high frequency signal which has been modulated in accordance with the particular modulation method used. RF module 6 downconverts the signal down to baseband, filters and amplifies the signal, and provides it to modem 8 for demodulation. The received packet data is decoded into digital PCM samples in modem 8 and is provided to three way switch 10 where it is routed to codec 14 when only ISS handset 16 is being used. Codec 14 accepts the PCM data and converts it into an analog signal, where it is then provided to handset 16 via a four-wire interface.

When analog telephone 18 is in use, speech from the near end speaker is provided from analog telephone 18 to subscriber line interface 12 via a two-wire connection. Analog telephone 18 contains a hybrid which combines the two-wire microphone signal with the two wire earpiece speaker signal to produce a two wire signal to ISS/SSS unit 2. Subscriber line interface 12 contains a 4-to-2-wire hybrid converter which converts the two wire signal from analog telephone 18 into a 2-wire transmit signal and a 2-wire receive signal. Subscriber Line Interface 12 also contains a codec used to transform the analog near end speech signal into digital PCM samples. The PCM samples are then provided to three way switch 10 where it is routed to modem 8 where the PCM samples are encoded into data packets that are modulated in accordance with the chosen modulation method. The modulated data is then provided to RF module 6 where is upconverted and then transmitted via antenna 4.

Received speech is processed in the same way as described above for the ISS case. If only analog telephone 18 is being used, the demodulated PCM signal from modem 8 is sent through three way switch 10 to subscriber line interface 12 only. There, the PCM signal is converted into an analog speech signal and then converted to a 2-wire signal by the hybrid located within subscriber line unit 12. The analog speech signal is then provided to analog telephone 18.

A conference call can be described in which there are at least three speakers carrying on a conversation: one far end speaker, one near end speaker using ISS handset 16, and a second near end speaker using analog telephone 18. During a conference call, three way switch 10 provides communications between all parties. The ISS speaker will be able to communicate with both the far end speaker and the analog telephone speaker simultaneously. The analog telephone speaker will be able to communicate with both the far end speaker and the ISS speaker simultaneously. The far end speaker will be able to communicate with both the ISS speaker and the analog telephone speaker simultaneously.

An echo signal is produced both by acoustic coupling at ISS handset 16 and as a result of an impedance mismatch at subscriber line interface 12. As a result, the far end speaker will hear an annoying echo of his own voice.

Figure 2:
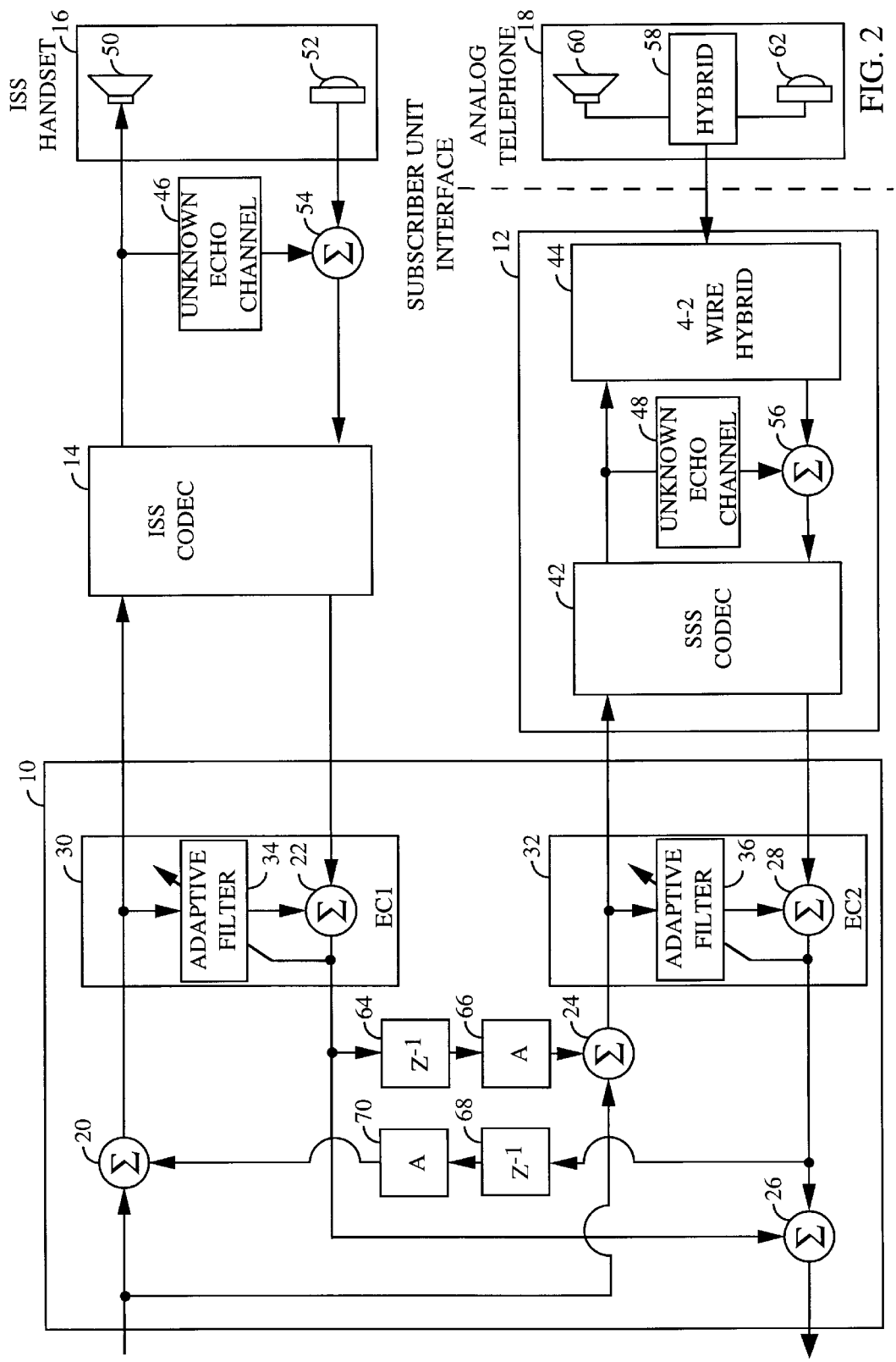
FIG. 2 is a functional block diagram of the three-way switch, ISS interface and SSS interface.

FIG. 2 is a detailed block diagram of three way switch 10, codec 14, and subscriber line interface 12. The present invention introduces two echo cancellers into the three way switch design. Echo canceller (EC1) 30 is used to cancel the earseal echo from handset 16 while echo canceller (EC2) 32 is used to cancel the hybrid echo created by hybrid 44. EC1 30 is comprised of adaptive filter block 34 which is used to estimate the unknown echo channel characteristics and summer 22 which subtracts the estimated echo signal from the near end speech signal. EC2 operates in similar fashion, and is comprised of adaptive filter block 36 and summer 28. In the exemplary embodiment, echo cancellers 30 and 32 are provided in the manner disclosed in the aforementioned '405 patent entitled "NETWORK ECHO CANCELLER."

In a conference call, referring again to FIG. 2, received speech from the far end speaker in the form of PCM samples are provided by modem 8 to summer 20 and summer 24. At summer 20, digitized speech samples from the analog telephone speaker are added to the far end digitized speech after passing through delay element 68 and attenuation element 70. Attenuation element 70 is an optional feature that is used to prevent the analog speaker's voice from being fed back along the return path from the ISS handset. This might occur when echo canceller 30 has not fully adapted to unknown echo channel 46 during the first few seconds of a call. Delay element 68 is a parasitic result of attenuator 70 and is thus not a physical element of the system.

The combined signal from summer 20 is provided to codec 14, where it is converted into an analog waveform and sent to ISS handset 16. The ISS speaker can hear both the far end speaker and the analog telephone speaker. The combined digital signal from summer 20 is also provided to EC1 30 for use as a reference signal to cancel the earseal echo from ISS handset 16. An earseal echo is created by acoustic coupling of the received speech from earpiece speaker 50 to microphone 52 in ISS handset 16 and is modeled as passing through unknown echo channel 46 and added at summer 54. It should be understood that unknown echo channel 46 and summer 54 are not included elements in the system itself, but rather are parasitic results from the physical proximity of microphone 52 and earpiece speaker 50.

A similar signal flow occurs for received speech provided to analog telephone 18. At summer 24, the digitized far end speech in PCM form is added to the ISS speaker's digitized speech samples, which have passed through attenuator 66 and delay element 64. Attenuator 66 is an optional feature that is used to prevent the ISS speaker's voice from being fed back along the return path from the SSS handset(s). This might occur when echo canceller 32 has not fully adapted to unknown echo channel 48 during the first few seconds of a call. Delay element 64 is a parasitic result of attenuator 66 and is thus not a physical element of the system.

The combined digital signal from summer 24 is provided to codec 42 where it is converted into an analog signal. The analog signal is then provided to hybrid 44 where it is converted into a 2 wire signal and then onto analog telephone 18 where it is received by hybrid 58. Hybrid 58 converts the two wire signal into a four wire signal: two wires to speaker 60 and two wires to microphone 62.

The combined digital signal from summer 24 is also provided to EC2 32 where it is used as a reference signal to cancel the echo resulting from hybrid 44. A hybrid echo is created by an impedance mismatch at hybrid 44 which causes the received analog speech signal to couple to the transmitted speech from the analog telephone speaker, modeled as passing through unknown echo canceller 48 and added at summer 56. Again, it should be understood that unknown echo channel 48 and summer 56 are not included elements in the system itself, but rather are parasitic results from the impedance mismatch at hybrid 44.

Speech from the ISS speaker is received by microphone 52 in ISS handset 16 and an echo signal is added to it, modeled by summer 54, as discussed above. The speech-plus-echo signal is provided to codec 14 in analog form and converted to digital PCM samples. The PCM samples are provided to summer 22 where an estimated echo signal is subtracted from it, resulting in an echo free signal which is then provided to summer 26. At summer 26, digitized speech from the analog telephone speaker is added to the echo canceled speech from summer 22 and then provided to modem 8 for modulation and eventual transmission to the far end speaker.

A similar process occurs for transmitted speech from the analog telephone speaker. Speech from the analog telephone speaker is received by microphone 62 inside analog telephone 18. The analog speech is provided to hybrid 58 inside analog telephone 18 where it is converted into a two-wire signal. The two-wire signal is provided to hybrid 44 inside ISS/SSS unit 2 and converted back into a four-wire signal: 2 wires for transmitted signals and 2 wires for received signals. An echo signal is added to the speech signal at summer 56, as described above. The analog speech-plus-echo signal is then provided to codec 42 where it is converted into digital PCM samples and provided to summer 28. An estimated echo signal generated by adaptive filter 36 is subtracted from the digital speech-plus-echo signal, leaving an echo canceled speech signal which is provided to summer 26. Speech from the ISS speaker is added to the echo free speech at summer 26 and is then provided to modem 8 for modulation and transmission to the far end speaker.

Figure 3:
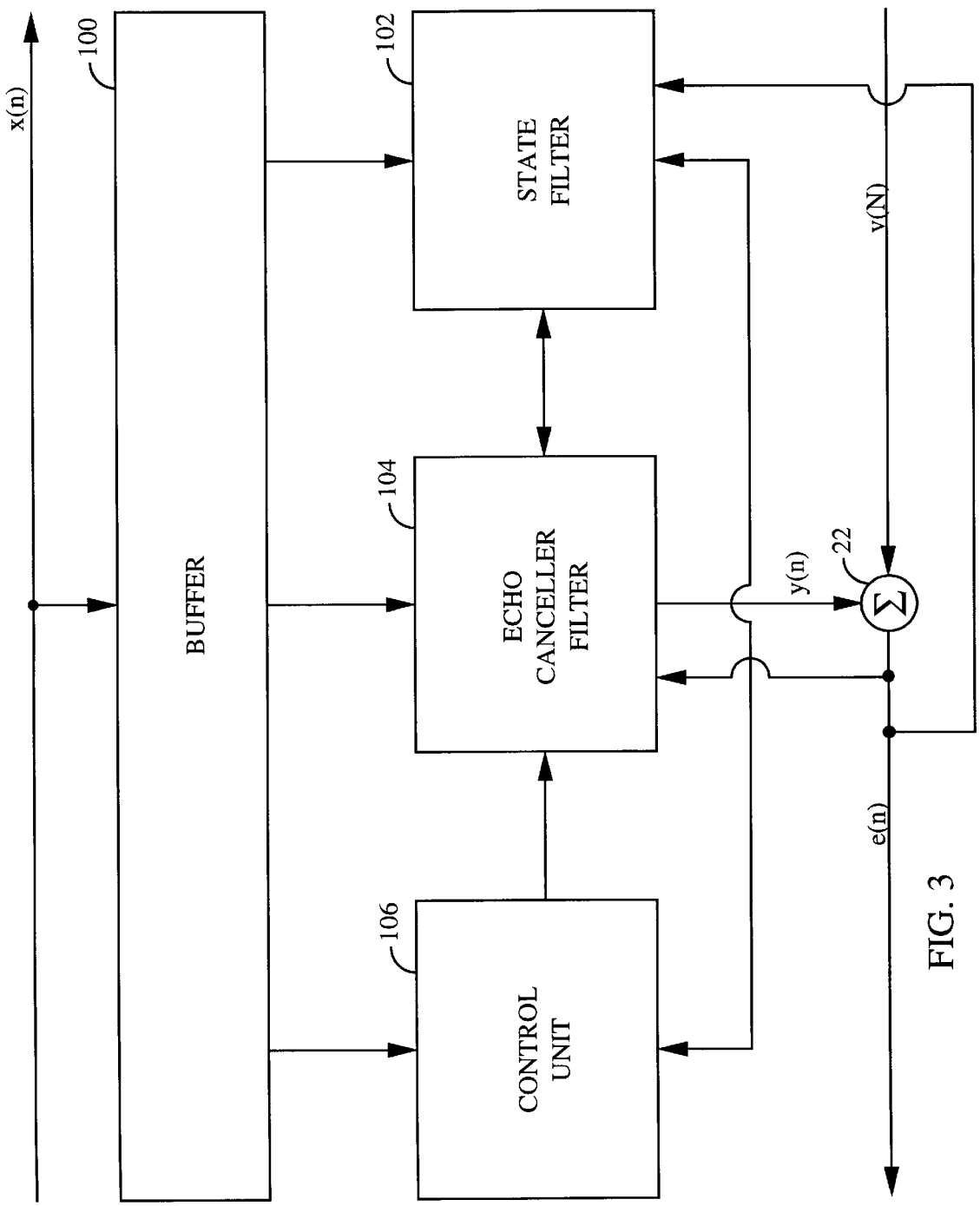
FIG. 3 is a simplified block diagram of an echo canceller.

FIG. 3 is a simplified functional block diagram of echo canceller 30. The figure is equally applicable to echo canceller 32. Full details of the echo canceller is disclosed in the aforementioned '405 patent It should be understood that in the exemplary embodiment, echo canceller 30 and 32 are in essence state machines with defined functions for each of the different states of operation. The states in which echo canceller 30 and 32 operate are silence, far-end speech, near-end speech, doubletalk, and hangover.

The following discussion is a description of echo canceller 30 and associated signal flows, however, the functionality is equally applicable to echo canceller 32. In FIG. 3, the received far end speech plus the echo canceled speech from summer 28 is labeled as x(n), while the received speech signal from the ISS near end is labeled as v(n). It should be understood that both x(n) and v(n) are digital representations of the analog speech waveforms.

The input far-end speech x(n) is stored in buffer 100 for input to state filter 102, echo canceller filter 104 and control unit 106. In the exemplary embodiment, state filter 102 and echo canceller filter 104 each have 256 taps. It should be understood that state filter 102 and echo canceller filter 104 may use a greater or lesser number of taps depending upon whether the echo to be canceled is an earseal echo or a hybrid echo.

Two independently-adapting filters, filters 102 and 104, track the unknown echo channel. While filter 104 performs the actual echo cancellation, filter 102 is used by the control unit 106 to determine which of several states echo canceller 30 should be operating in. For this reason, filters 102 and 104 are respectively referred to as the state filter and the echo canceller filter. The advantage of this two-filter approach is that the filter coefficients of echo canceller filter 104, which model unknown echo channel, can be preserved more effectively without risk of degradation from near-end speech. State determination from state filter 102 is provided to control unit 106 where it is used to decide at when to adjust the tap coefficients to state filter 102 and echo canceller filter 104.

Echo canceller filter 104 provides an echo replica signal y(n) to one input of summer 22 where it is subtracted from the signal v(n). The echo replica signal y(n) is generated by estimating the impulse response of the unknown echo channel during periods of near end silence. The resultant echo suppressed signal e(n) output from summer 22 is fed back as an input to control unit 106 and is also provided to summer 26 and delay element 36, shown in FIG. 2.

The advantage of having two echo cancellers in the design is that when a second speaker hangs up or picks up an additional line, the impulse response to the second echo canceller does not change. Therefore, echo canceller filter 104 and state filter 102 do not have to adapt their filter tap coefficients in response to the channel change. This results in a more accurate echo estimation signal. In other words, echo canceller 30 can adapt when the ISS speaker is silent and the far end speaker or analog telephone speaker is talking. Similarly, echo canceller 32 can adapt when the analog telephone speaker is silent and the far end speaker or ISS speaker is talking. If it is assumed that the active speech durations are evenly distributed between each speaker, each echo canceller can adapt two-thirds of the time. If a single echo canceller was used, it could only adapt one-third of the time.

Another advantage of the present invention is that each echo canceller will converge faster than if a single echo canceller were to be used. Echo canceller filter 104 and state filter 102 can only determine the unknown echo channel characteristics and converge when the near end speaker is silent. If only one near end speaker is assigned to each echo canceller, a near end silent state is much more likely to occur than if there is more than one near end speaker assigned to a single echo canceller.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus to cancel both earseal echo and hybrid echo in a wireless local loop system, said system comprising a far end speaker in wireless communication with at least two near end speakers, said near end speakers using a wireless subscriber unit, said subscriber unit having at least two user interfaces, one interface being a dedicated handset, and at least one other interface being a 2-wire, standard analog telephone, said standard analog telephone connected to said subscriber unit via a 4-to-2 wire hybrid, wherein said subscriber unit allows simultaneous communication between said far end speaker, a first near end speaker using said dedicated handset, and a second near end speaker using said standard analog telephone, said apparatus comprising:

a first echo canceling means located within said subscriber unit for eliminating said earseal echo generated at said dedicated handset; and a second echo canceling means located within said subscriber unit for eliminating said hybrid echo generated at said 4-to-2 wire hybrid.

2. The apparatus of claim 1 wherein said first echo canceller means operates independently of said second echo canceller.

3. A method to cancel both earseal echo and hybrid echo in a wireless local loop system, said system comprising a far end speaker in wireless communication with at least two near end speakers, said near end speakers using a wireless subscriber unit, said subscriber unit having at least two user interfaces, one interface being a dedicated handset, and at least one other interface being a 2-wire, standard analog telephone, said standard analog telephone connected to said subscriber unit via a 4-to-2 wire hybrid, wherein said subscriber unit allows simultaneous communication between said far end speaker, a first near end speaker using said dedicated handset, and a second near end speaker using said standard analog telephone, said method comprising the steps of:

providing a digital far end speech signal and a first digital speech-plus-echo signal from said dedicated handset to a first echo canceller;

generating a digital echo replica signal which approximates said earseal echo signal;

subtracting said digital echo replica signal from said first digital speech-plus-echo signal to produce a first echo suppressed speech signal;

providing said digital far end speech signal and a second digital speech-plus-echo signal from said standard analog telephone to a second echo canceller;

generating a digital echo replica signal which approximates said hybrid echo signal; and subtracting said digital echo replica signal from said second speech-plus-echo signal to produce a second echo suppressed speech signal.

4. The method of claim 3 further comprising the steps of:

combining said first echo suppressed speech signal and said second echo suppressed speech signal; and providing said combined echo suppressed speech signal to said far end speaker.

5. A wireless telephone for allowing two or more users to communicate simultaneously with each other and a far end user, comprising:

a dedicated handset for providing a first telephonic input;

at least one interface for receiving an analog telephone input;

a first codec connected to a three way switch and said handset, for transforming a first analog signal from said handset into a first digital signal and for transforming a second digital signal from said three way switch into a second analog signal;

a subscriber line interface connected to at least one analog telephone and said three way switch, for transforming a third analog signal from said at least one analog telephone into a third digital signal and for transforming a fourth digital signal from said three way switch into a fourth analog signal;

said three way switch connected to said codec, said subscriber line interface, and to a modem, for combining said first digital signal, said third digital signal, and digitized speech samples from a far end user.

6. The wireless telephone of claim 5 further comprising at least one echo canceller.

7. The wireless telephone of claim 5 wherein said subscriber line interface comprises:

a second codec; and a hybrid for providing an interface between said second codec and said at least one analog telephone.

8. The wireless telephone of claim 5 wherein said first digital signal, said third digital signal, and said digitized speech samples are in the form of PCM data packets.

9. The wireless telephone of claim 5 wherein said three way switch comprises:

a first echo canceller connected to said first codec, a first summer, a second summer, and a third summer, for receiving said first digital signal from said first codec and a first combined echo-canceled signal from said first summer and for producing a first echo-canceled signal to said second summer and said third summer;

a second echo canceller connected to said subscriber line interface, said first summer, said second summer, and said third summer, for receiving said third digital signal from said subscriber line interface and a second combined echo-canceled signal from said second summer and for producing a second echo-canceled signal to said first summer and said third summer;

said first summer having a first input connected to said second echo canceller and said third summer, a second input connected to said modem for receiving said digitized speech samples from a far end user, and an output connected to said first echo canceller and to said first codec, said first summer for combining said second echo-canceled signal and said digitized speech samples to produce a first combined echo-canceled signal;

said second summer having a first input connected to said first echo canceller, a second input connected to said modem for receiving said digitized speech samples from a far end user, and an output connected to said second echo canceller and to said subscriber line interface, said second summer for combining said first echo-canceled signal and fifth digital signal to produce a second combined echo-canceled signal; and said third summer having a first input connected to said second summer and to said first echo canceller, a second input connected to said first summer and said second echo canceller, and an output connected to said modem, said third summer for combining said first echo-canceled signal and said second echo-canceled signal to produce a third combined echo-canceled signal.

10. The wireless telephone of claim 9, further comprising:

a first attenuator interposed between said second summer and said first echo canceller; and a second attenuator interposed between said first summer and said second echo canceller.

11. The wireless telephone of claim 9 further comprising:

a first delay element interposed between said second summer and said first echo canceller; and a second delay element interposed between said first summer and said second echo canceller.

12. A method for providing communication between at least three users, a first near-end user using a dedicated handset in a wireless local loop system, at least one other near-end user each using an analog telephone, and a far-end user, comprising the steps of:

digitizing a first analog signal from a first near-end user to produce a first digital signal;

digitizing a second analog signal from at least one other near-end user to produce a second digital signal;

summing a signal from a far-end user with said first digital signal and providing a first combined signal to said at least one other near-end user;

summing a signal from a far-end user with said second digital signal and providing a second combined signal to said first near-end user; and summing said first digital signal with said second digital signal to provide a third combined signal to said far-end user.

13. The method of claim 12 further comprising the steps of:

reducing a first echo signal imposed upon said first analog signal using a first echo canceller; and reducing a second echo signal imposed upon said second analog signal using a second echo canceller.

* * * * *